United States Patent
Fong (10) Patent No.: US 9,616,499 B1
(45) Date of Patent: Apr. 11, 2017

(54) VERTICAL RIM TRIMMING MACHINE

(71) Applicant: Chen-Fu Fong, Taichung (TW)

(72) Inventor: Chen-Fu Fong, Taichung (TW)

(*) Notice: Subject to any disclaimer, the term of this patent is extended or adjusted under 35 U.S.C. 154(b) by 0 days.

(21) Appl. No.: 15/072,442

(22) Filed: Mar. 17, 2016

(30) Foreign Application Priority Data

Dec. 18, 2015 (TW) .............................. 104142658 A (51) Int. Cl.
*B23Q 1/00* (2006.01)
*B23B 5/28* (2006.01)

(52) U.S. Cl.
CPC ............ *B23B 5/28* (2013.01); *B23B 2215/08* (2013.01)

(58) Field of Classification Search
CPC .... B23C 1/002; B23C 1/007; B23C 1/02; B23C 1/14; B23C 1/18; B23C 3/04; B23Q 1/626; B23Q 1/445; B24B 41/02
See application file for complete search history.

(56) References Cited

U.S. PATENT DOCUMENTS

| | | | | |
|---|---|---|---|---|
| 2,748,665 | A * | 6/1956 | Senn .................. | B23Q 5/28 116/231 |
| 2,991,663 | A * | 7/1961 | McHugh .............. | B23B 39/04 409/80 |
| 7,147,595 | B1 * | 12/2006 | Chen .................. | B23C 1/06 29/33 P |
| 7,204,493 | B1 | 4/2007 | Gatton | |
| 7,343,955 | B2 | 3/2008 | Cunningham | |
| 8,104,377 | B2 * | 1/2012 | Nakamura ........... | B23Q 16/025 74/813 R |
| 9,381,580 | B2 * | 7/2016 | Yang .................. | B23C 3/12 |
| 2006/0089089 | A1 | 4/2006 | Kato et al. | |
| 2006/0194682 | A1 * | 8/2006 | Sugata ................. | B23Q 1/626 483/3 |
| 2012/0207559 | A1 * | 8/2012 | Kai ....................... | B23Q 1/015 409/79 |
| 2012/0295516 | A1 * | 11/2012 | Guo ..................... | B24B 41/02 451/5 |
| 2013/0149055 | A1 * | 6/2013 | Tsai ..................... | B23Q 1/626 408/13 |

FOREIGN PATENT DOCUMENTS

| | | |
|---|---|---|
| CN | 200954545 Y | 10/2007 |
| CN | 101456081 A | 6/2009 |
| CN | 201292264 U | 4/2012 |

(Continued)

*Primary Examiner* — Will Fridie, Jr.
(74) *Attorney, Agent, or Firm* — Alan D. Kamrath; Kamrath IP Lawfirm, P.A.

(57) ABSTRACT

A vertical rim trimming machine has a base, a horizontal sliding stand, a vertical sliding stand, a cutter turret, a bottom stand and a fixture. The horizontal sliding stand is mounted on and can horizontally move with respect to the base. The vertical sliding stand is mounted on and can vertically move with respect to the horizontal sliding stand. The cutter turret is mounted on the vertical sliding stand. The bottom stand is mounted on the base. The fixture is mounted on the bottom stand. Thus, the horizontal sliding stand horizontally moves with respect to the base stably and the vertical sliding stand vertically moves with respect to the horizontal sliding stand stably, such that the structure of the vertical rim trimming machine becomes firmer and the stability of trimming is improved.

4 Claims, 6 Drawing Sheets

(56) References Cited

FOREIGN PATENT DOCUMENTS

| | | |
|---|---|---|
| CN | 203751460 U | 8/2014 |
| CN | 203929016 U | 11/2014 |
| DE | 10058627 A1 | 6/2002 |
| EP | 0949029 A1 | 10/1999 |
| TW | 262772 | 11/1995 |
| TW | M456290 U | 7/2013 |
| TW | M478563 U | 5/2014 |

* cited by examiner

VERTICAL RIM TRIMMING MACHINE

CROSS-REFERENCE TO RELATED APPLICATIONS

This application is based upon and claims priority under 35 U.S.C. 119 from Taiwan Patent Application No. 104142658 filed on Dec. 18, 2015, which is hereby specifically incorporated herein by this reference thereto.

BACKGROUND OF THE INVENTION

1. Field of the Invention

The present invention relates to a rim trimming machine, especially to a vertical rim trimming machine.

2. Description of the Prior Arts

Figure 6:
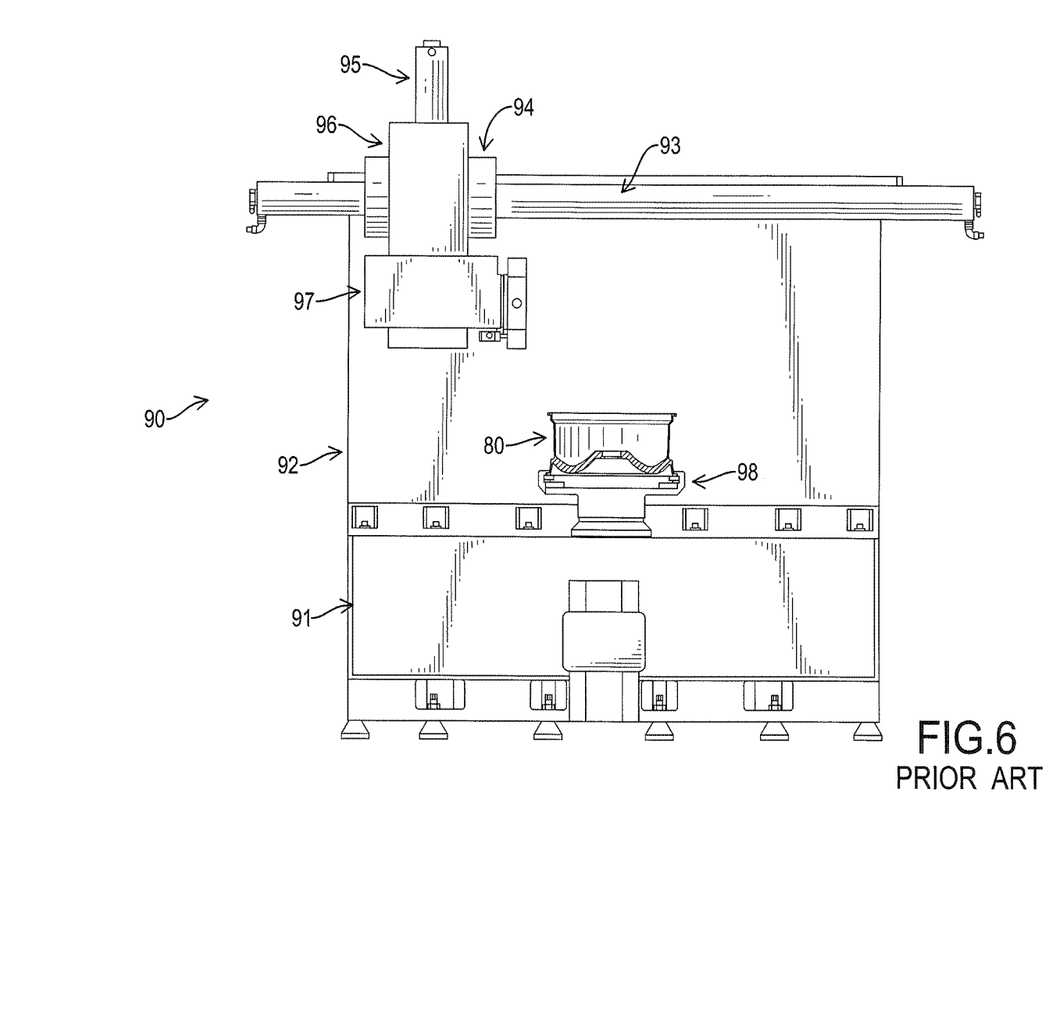
FIG. 6 is a front view of a conventional rim trimming machine.

With referenced to FIG. 6, a conventional rim trimming machine 90 comprises a base 91, a mounting wall 92, a horizontal sliding element 93, a horizontal sliding stand 94, a vertical sliding element 95, a vertical sliding stand 96, a cutter turret 97, and a fixture 98. The mounting wall 92 is connected to a rear surface of the base 91. The horizontal sliding element 93 is transversely hung on a top end of the mounting wall 92, and the horizontal sliding stand 94 is mounted on and is horizontally movable with respect to a front surface of the horizontal sliding element 93, such that the horizontal sliding stand 94 is horizontally disposed above the base 91. The vertical sliding element 95 is securely mounted on a front surface of the horizontal sliding stand 94, and the vertical sliding stand 96 is mounted on and is vertically movable with respect to a front surface of the vertical sliding element 95, and the cutter turret 97 is securely mounted on a bottom end of the vertical sliding with respect to the base 91 by the horizontal sliding stand 94 and the vertical sliding element 95. The fixture 98 is mounted on a top surface of the base 91, and is disposed below the horizontal sliding element 93 correspondingly. The fixture 98 is connected to an actuator (not shown in the figure), such that the fixture 98 is horizontally rotatable with respect to the base 91. The fixture 98 is for clamping a rim 80, such that the cutter turret 97 trims the rim 80 via a cutter (not shown in the figure).

However, because the horizontal sliding element 93 is hung on the top end of the mounting wall 92, when the horizontal sliding stand 94 moves horizontally, the horizontal sliding stand 94 has to bear the vertical sliding element 95, the vertical sliding stand 96, and the cutter turret 97, which increases the loading of the horizontal sliding element 93 and makes the rigidity of the horizontal sliding element 93 inadequate. Therefore, the horizontal sliding stand 94 may easily shake with respect to the horizontal sliding element 93 when the cutter of the cutter turret 97 trims the rim 80. In addition, a vertical length of the vertical sliding element 95 is limited, such that when the vertical sliding stand 96 is moved downward to the lowest position relative to the vertical sliding element 95, a bottom end of the vertical sliding stand 96 may partially protrude and be exposed out of the vertical sliding element 95 without support. That is, the vertical sliding element 95 cannot provide the abutting force to the vertical sliding stand 96 such that the cutter turret 97 may easily shake with respect to the rim 80 when the cutter turret 97 trims the rim 80 via the cutter, and the shake decreases the accuracy of trimming. Thus, the conventional rim trimming machine should be improved.

To overcome the shortcomings, the present invention provides a vertical rim trimming machine to mitigate or obviate the aforementioned problems.

SUMMARY OF THE INVENTION

The main objective of the present invention is to provide a vertical rim trimming machine which solves the problems generated by the conventional rim trimming machine which has a horizontal sliding element transversely hung on a top end of a mounting wall such that a horizontal sliding stand has to bear a vertical sliding element, a vertical sliding stand and a cutter turret, which causes the defect that the horizontal sliding stand easily shakes with respect to the horizontal sliding element when a cutter of a cutter turret is trimming a rim. The vertical rim trimming machine of the present invention also solves the problems generated by the conventional rim trimming machine which has the vertical sliding element with limited length such that when the vertical sliding stand is moved downward to the lowest position, the bottom end of the vertical sliding stand may partially protrude and be exposed out of the vertical sliding element without support, which makes the cutter of the cutter turret shake easily and decrease the accuracy of trimming. Therefore, the present invention provides the vertical rim trimming machine which comprises a horizontal sliding stand which is mounted on and capable of horizontally moving with respect to a top surface of a base, a vertical sliding stand which is mounted on and is vertically movable with respect to a front surface of the horizontal sliding stand, and a rear surface of the vertical sliding stand which keeps connecting with and does not separate from the front surface of the horizontal sliding stand for providing an abutting force which the vertical sliding stand needs, so that the structure of the present invention may be firmer and the stability of trimming a rim via the cutter turret is improved.

The vertical rim trimming machine comprises:
a base comprising:
two first axial channels mounted on a top surface of the base and parallel to and spaced from each other;
a first axial actuator mounted on the top surface and a lateral surface of the base and at one end of the first axial channels, and
a first axial threaded shaft mounted on the top surface of the base and between the two first axial channels and connected with the first axial actuator for controlling a rotating direction of the first axial threaded shaft via the first axial actuator;
a horizontal sliding stand uprightly mounted on the top surface of the base and horizontally movable with respect to the base, a bottom surface of the horizontal sliding stand mounted across on the two first axial channels of the base;
the horizontal sliding stand comprising:
a first axial threaded sleeve mounted on the bottom surface of the horizontal sliding stand and screwed with the first axial threaded shaft;
two second axial channels mounted on a front surface of the horizontal sliding stand and parallel to and spaced from each other;
a second axial actuator mounted on the front surface and at a top end of the horizontal sliding stand; and
a second axial threaded shaft mounted on the front surface of the horizontal sliding stand and between the two second axial channels, and connected with the second axial actuator for controlling a rotational direction of the second axial threaded shaft via the second axial actuator;

a vertical sliding stand mounted on the front surface of the horizontal sliding stand and vertically movable with respect to the horizontal sliding stand, and a rear surface of the vertical sliding stand mounted across on the two second axial channels of the horizontal sliding stand and connecting with the front surface of the horizontal sliding stand; the vertical sliding stand comprising     a second axial threaded sleeve mounted on the rear surface of the vertical sliding stand and screwed with the second axial threaded shaft;

a cutter turret mounted on a front surface of the vertical sliding stand, and comprising     a cutter securely mounted on the cutter turret;

a bottom stand mounted on a front surface of the base; and a fixture mounted a top surface of the bottom stand.

The aforesaid vertical rim trimming machine, wherein the bottom stand comprises:

a motor mounted on the top surface of the bottom stand and connected with the fixture so that the fixture is horizontally rotatable with respect to the bottom stand.

The aforesaid vertical rim trimming machine, wherein the fixture comprises:

a plurality of jaws mounted on a top surface of the fixture.

The advantages of the present invention are:

1. The present invention provides an abutting force which the vertical sliding stand needs through the horizontal sliding stand mounted on the top surface of the bottom stand and horizontally movable with respect to the bottom stand, the vertical sliding stand mounted on the front surface of the horizontal sliding stand and vertically movable with respect to the horizontal sliding stand, and the rear surface of the vertical sliding stand connecting to the front surface of the horizontal sliding stand without separating. Thus, the horizontal sliding stand is horizontally movable with respect to the bottom stand stably, and the vertical sliding stand is also vertically movable with respect to horizontal sliding stand stably. Compared to the conventional rim trimming machine which has the horizontal sliding element hung on a top of the mounting wall, causing the defect that the horizontal sliding stand may easily shake with respect to the horizontal sliding element when the cutter turret trims the rim, the structure of the present invention may be firmer and the stability of trimming a rim via the cutter turret is improved.

2. The present invention has the horizontal sliding stand which is capable of supporting the vertical sliding stand when the vertical sliding stand moves downward to the lowest position relative to the horizontal sliding stand. The conventional rim trimming machine has a defect that decreases the accuracy of trimming because the conventional rim trimming machine has the vertical sliding element with limited length, which causes that the bottom of the vertical sliding stand may be suspending with respect to the vertical sliding element when the vertical sliding stand moves downward to the lowest position relative to the vertical sliding element and the vertical sliding element cannot provide the abutting force which the vertical sliding stand needs. Compared to the conventional rim trimming machine, the present invention provides the abutting force to the vertical sliding stand through the horizontal sliding stand uprightly mounted on the top surface of the bottom stand and makes the rear surface of the vertical sliding stand keep connecting with the front surface of the horizontal sliding stand without separating. Thus, the present invention improves the accuracy of the vertical movement of the vertical sliding stand.

Other objectives, advantages and novel features of the invention will become more apparent from the following detailed description when taken in conjunction with the accompanying drawings.

DETAILED DESCRIPTION OF THE PREFERRED EMBODIMENTS

Figures 1A, 1B:
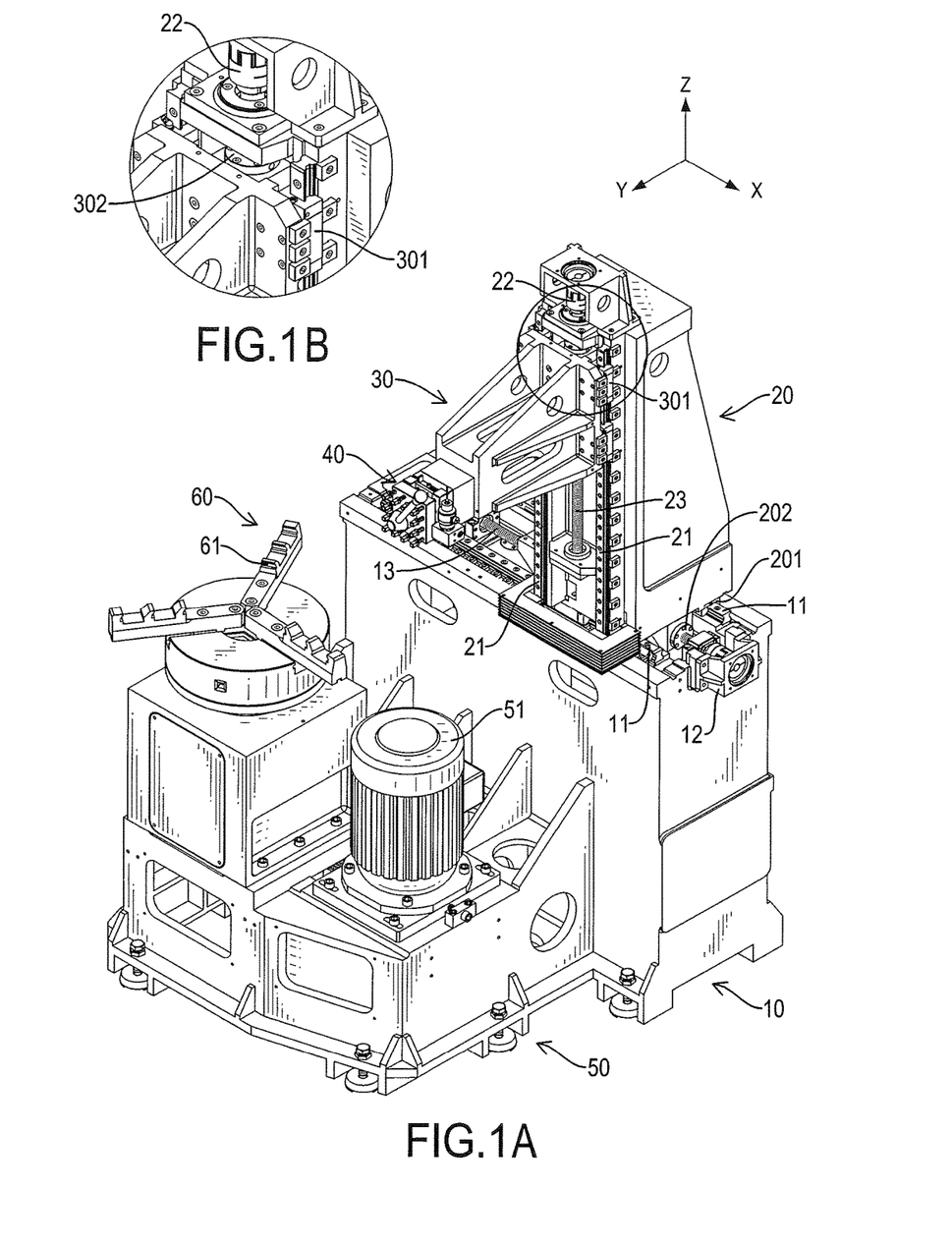
FIG. 1A is a perspective view of a vertical rim trimming machine in accordance with a preferred embodiment of the present invention.
FIG. 1B is an enlarged perspective view of a part of the vertical rim trimming machine in FIG. 1A
Figure 2:
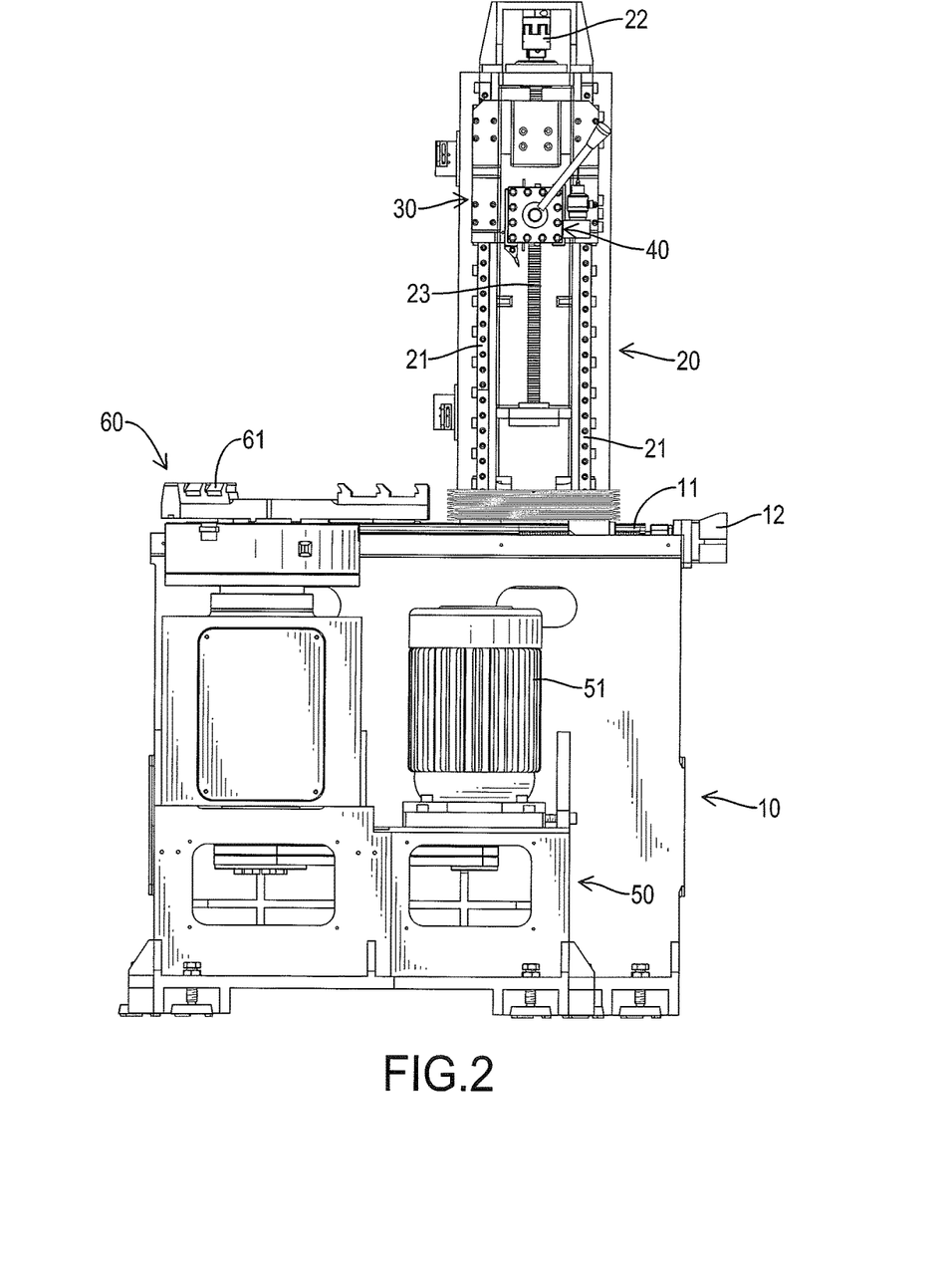
FIG. 2 is a front view of the vertical rim trimming machine in FIG. 1A.

With reference to FIGS. 1A, 1B and 2, a preferred embodiment of a vertical rim trimming machine in accordance with the present invention comprises a base 10, a horizontal sliding stand 20, a vertical sliding stand 30, a cutter turret 40, a bottom stand 50 and a fixture 60.

The base 10 comprises a top surface, a front surface, two first axial channels 11, a first axial actuator 12 and a first axial threaded shaft 13. The first axial channels 11 are mounted on the top surface of the base 10 and are parallel to and spaced from each other. Preferably, the first axial channels 11 are disposed in the X-axis direction. The first axial actuator 12 is mounted on the top surface and a lateral surface of the base 10, and at one end of the first axial channels 11. The first axial threaded shaft 13 is mounted on the top surface of the base and between the first axial channels 11 and is parallel to the first axial channels 11. The first axial threaded shaft 13 is connected with the first axial actuator 12 so that the first axial actuator 12 is capable of controlling the rotational direction of the first axial threaded shaft 13.

The horizontal sliding stand 20 is uprightly mounted on the top surface of the base 10 and is horizontally movable with respect to the base 10. A bottom surface of the horizontal sliding stand 20 is mounted across on the first axial channels 11 and comprises a plurality of channel stands 201 and a first axial threaded sleeve 202. The channel stands 201 are connected with the first axial channels 11. The first axial threaded sleeve 202 is screwed with the first axial threaded shaft 13. When the first axial actuator 12 is switched on, the first axial threaded shaft 13 rotates with respect to the first axial threaded sleeve 202, which makes the horizontal sliding stand 20 laterally move in the X-axis direction with respect to the base 10. The horizontal sliding stand 20 comprises two second axial channels 21, a second axial actuator 22 and a second axial threaded shaft 23. The second axial channels 21 are mounted on a front surface of the horizontal sliding stand 20 and are parallel to and spaced from each other. Preferably, the second axial channels 21 are disposed in the Z-axis direction. The second axial actuator 22 is mounted on the front surface and at a top end of the horizontal sliding stand 20. The second axial threaded shaft 23 is mounted on the front surface of the horizontal sliding stand 20 and between the second axial channels 21. Besides, the second axial threaded shaft 23 is parallel to the second axial channels 21. The second axial threaded shaft 23 is connected with the second axial actuator 22 so that the second axial actuator 22 is capable of controlling a rotational direction of the second axial threaded shaft 23, which makes the horizontal sliding stand 20 laterally move in the X-axis direction with respect to the base 10.

Figure 3:
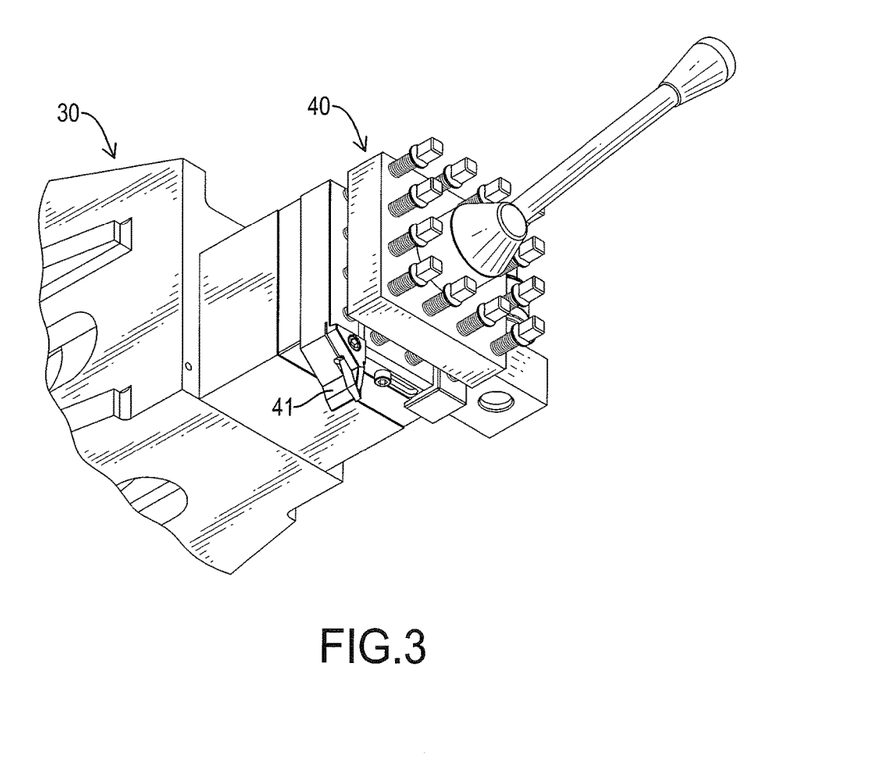
FIG. 3 is an enlarged perspective view of a part of the vertical rim trimming machine in FIG. 1A.
Figure 4:
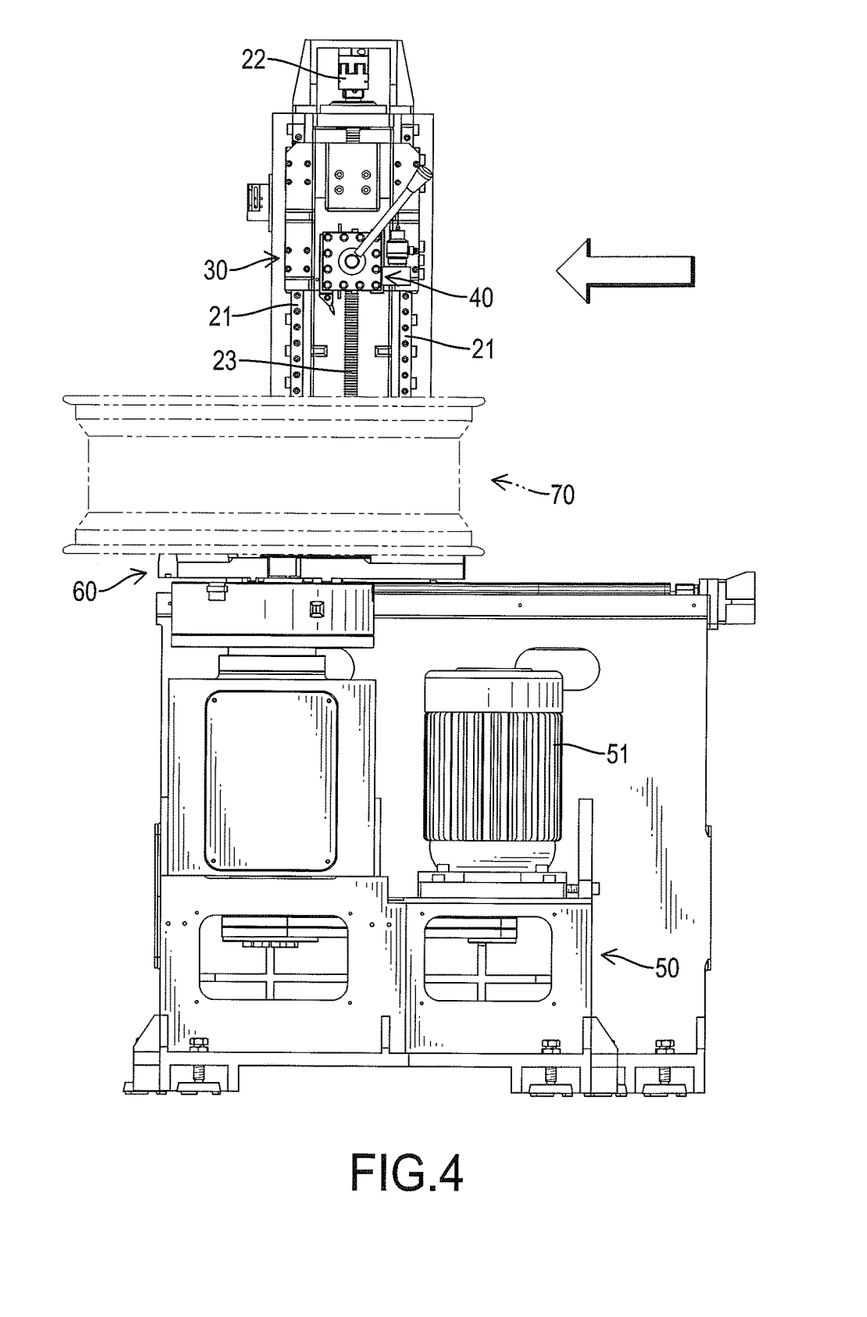
FIGS. 4 and 5 are enlarged front views of a part of the vertical rim trimming machine in FIG. 1A.
Figure 5:
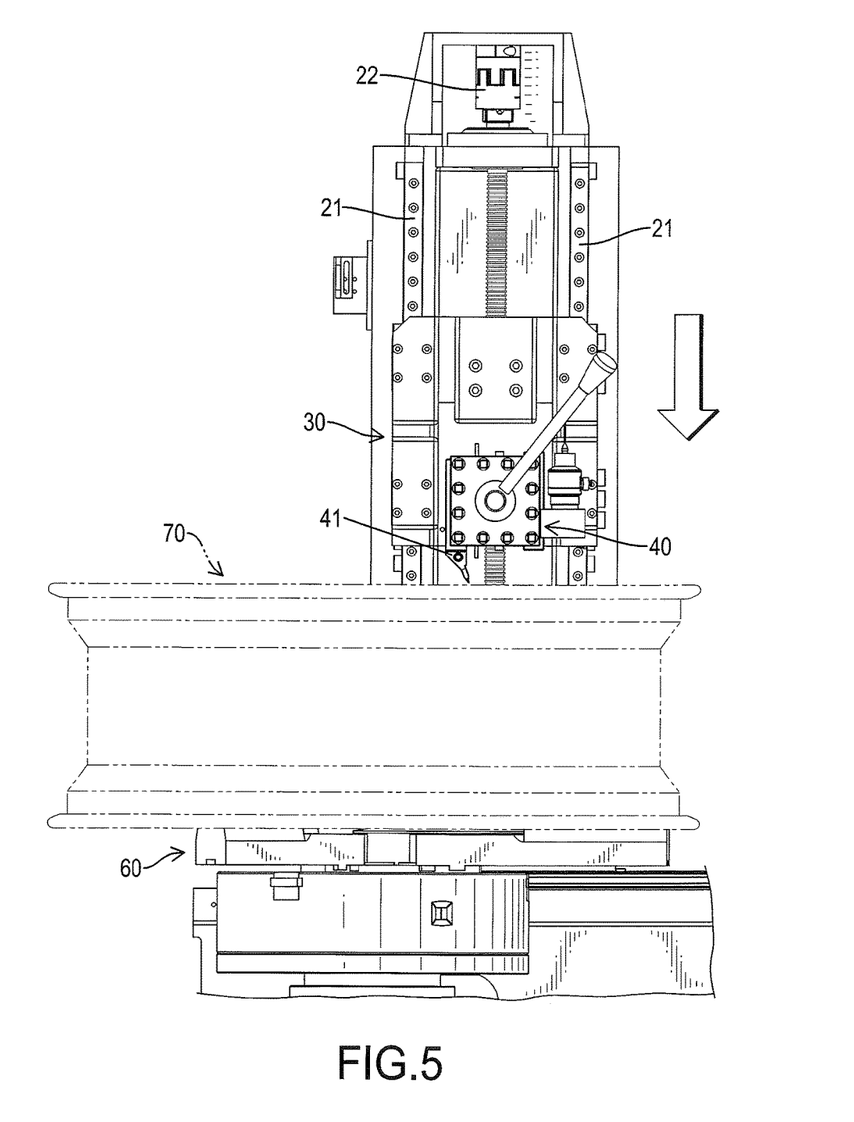

The vertical sliding stand 30 is mounted on the front surface of the horizontal sliding stand 20 and is vertically movable with respect to the horizontal sliding stand 20, and a rear surface of the vertical sliding stand 30 is kept connecting with and does not separate from the front surface of the horizontal sliding stand 20. The rear surface of the vertical sliding stand 30 is mounted across on the second axial channels 21 of the horizontal sliding stand 20 and comprises a plurality of channel stands 301 and a second axial threaded sleeve 302. The channel stands 301 are connected with the second axial channels 21. The second axial threaded sleeve 302 is screwed with the second axial threaded shaft 23. When the second axial actuator 22 is switched on, the second axial threaded shaft 23 rotates with respect to the second axial threaded sleeve 302, which makes the vertical sliding stand 30 vertically move in the Z-axis direction with respect to the base 10 and a front surface of the vertical sliding stand 30 expose out of the base 10. With reference to FIG. 3, the cutter turret 40 is mounted on the front surface of the vertical sliding stand 30, and comprises a cutter 41 securely mounted on the cutter turret 40.

The bottom stand 50 is mounted on the front surface of the base 10, and comprises a motor 51 mounted on a top surface of the bottom stand 50. The fixture 60 is mounted on the top surface of the bottom stand 50. With reference to FIG. 2, a bottom of the fixture 60 is connected with the motor 51 through a transmission member, e.g. a belt, which makes the fixture 60 horizontally rotate with respect to the base 10. Besides, with the horizontal sliding stand 20 moving with respect to the base 10, the fixture 60 is capable of being located under the cutter turret 40 correspondingly. The fixture 60 comprises a plurality of jaws 60 movably mounted on a top surface of the fixture 60.

With reference to FIGS. 1A, 1B, 4 and 5, the operation of the present invention is to dispose a rim 70 on the top of the fixture 60 and clamp the rim 70 with the jaws 61 of the fixture 60, switch on the motor 51 and make the rim 70 horizontally rotate with respect to the bottom stand 50, then switch on the first axial actuator 12 and the second axial actuator 22 and make the horizontal sliding stand 20 face to the fixture 60 and laterally move in the X-axis direction, and make the vertical sliding stand 30 move vertically downward in the Z-axis direction with respect to the base 10. Thus, the cutter 41 of the cutter turret 40 can trim the rim 70.

The conventional rim trimming machine has the defect that the horizontal sliding element 93 is hung on the top of the mounting wall 92 and the horizontal sliding stand 94 bears the vertical sliding element 95, the vertical sliding stand 96 and the cutter turret 97, which increases the burden of the horizontal sliding element 93 and makes the rigidity of the horizontal sliding element 93 inadequate. Another defect is that the conventional rim trimming machine comprises the vertical sliding element 95 with a limited length, the bottom of the vertical sliding stand 96 may partially protrude and be exposed out of the vertical sliding element 95 without support when the vertical sliding stand 96 moves downward to the lowest position relative to the vertical sliding element 95, which causes the vertical sliding stand 96 unable to provide the abutting force which the vertical sliding stand 96 needs, and causes the cutter turret 97 to shake with respect to the rim 80 when the cutter turret 97 is trimming the rim 80. Compared to the conventional rim trimming machine 90, the present invention has the horizontal sliding stand 20 mounted on and horizontally movable with respect to the top surface of the base 10, the vertical sliding stand 30 mounted on and vertically movable with respect to the front surface of the horizontal sliding stand 20, and the rear surface of the vertical sliding stand 30 connected with the front surface of the horizontal sliding stand 20 without separating, which causes the horizontal sliding stand 20 to stably and horizontally move with respect to the base 10, and causes the vertical sliding stand 30 to stably and vertically move with respect to the horizontal sliding stand 20. Thus, the structure of the present invention is firmer, and the stability of trimming a rim via the cutter turret is improved. In addition, the horizontal sliding stand 20 of the present invention is uprightly mounted on the top surface of the base 10 so that the horizontal sliding stand 20 keeps connecting with and does not separate from the vertical sliding stand 30, which improves the stability during vertical movement of the vertical sliding stand 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vertical rim trimming machine comprising:
   a base comprising:
      two first axial channels mounted on a top surface of the base and parallel to and spaced from each other;
      a first axial actuator mounted on the top surface and a lateral surface of the base and at one end of the first axial channels, and
      a first axial threaded shaft mounted on the top surface of the base and between the two first axial channels and connected with the first axial actuator for controlling a rotating direction of the first axial threaded shaft via the first axial actuator;
   a horizontal sliding stand uprightly mounted on the top surface of the base and horizontally movable with respect to the base, a bottom surface of the horizontal sliding stand mounted across on the two first axial channels of the base; the horizontal sliding stand comprising:
      a first axial threaded sleeve mounted on the bottom surface of the horizontal sliding stand and screwed with the first axial threaded shaft;
      two second axial channels mounted on a front surface of the horizontal sliding stand and parallel to and spaced from each other;
      a second axial actuator mounted on the front surface and at a top end of the horizontal sliding stand; and
      a second axial threaded shaft mounted on the front surface of the horizontal sliding stand and between the two second axial channels, and connected with the second axial actuator for controlling a rotational direction of the second axial threaded shaft via the second axial actuator;
   a vertical sliding stand mounted on the front surface of the horizontal sliding stand and vertically movable with respect to the horizontal sliding stand, and a rear surface of the vertical sliding stand mounted across on the two second axial channels of the horizontal sliding stand and connecting with the front surface of the horizontal sliding stand; the vertical sliding stand comprising
    a second axial threaded sleeve mounted on the rear surface of the vertical sliding stand and screwed with the second axial threaded shaft;
a cutter turret mounted on a front surface of the vertical sliding stand, and comprising
    a cutter securely mounted on the cutter turret;
a bottom stand mounted on a front surface of the base; and
a fixture mounted a top surface of the bottom stand.

2. The vertical rim trimming machine as claimed in claim 1, wherein the bottom stand comprises:
    a motor mounted on the top surface of the bottom stand and connected with the fixture so that the fixture is horizontally rotatable with respect to the bottom stand.

3. The vertical rim trimming machine as claimed in claim 1, wherein the fixture comprises:
    a plurality of jaws mounted on a top surface of the fixture.

4. The vertical rim trimming machine as claimed in claim 2, wherein the fixture comprises:
    a plurality of jaws mounted on a top surface of the fixture.

\* \* \* \* \*